United States Patent Office 3,150,203
Patented Sept. 22, 1964

3,150,203
PROCESS FOR HYDROGENATION OF ALKENES
James W. Shepherd, Gibsonia, Pa., assignor to Callery
Chemical Company, Pittsburgh, Pa., a corporation of
Pennsylvania
No Drawing. Filed Dec. 26, 1961, Ser. No. 162,226
6 Claims. (Cl. 260—683.9)

This invention relates to an improved method for the hydrogenation of alkenes, and more particularly to such a method in which a new and improved catalyst is used.

There are several commercial processes in which the hydrogenation of alkenes plays an important part. For example, the hydrogenation of olefins to paraffins is involved in the hardening of fats and oils and the production of aviation gasoline, as by the saturation of diisobutylene. In these processes, a number of catalysts have been and are being used, including nickel, copper and molybdenum as well as platinum, palladium and other reduced metals. In some instances, mixed oxides or sulfides are employed. The various catalysts used show significant variations in their effectiveness and in addition are apt to be poisoned during the reaction and thus require that very pure hydrogen be used. Moreover, it is always desirable to have as much surface area of the catalyst as possible exposed to the reactants, so that colloidal dispersions of the catalysts are often used.

It is generally understood that the use of soluble catalysts in place of the insoluble catalysts now in use would provide several advantages, such as easier handling and longer catalyst life, and would avoid many of the disadvantages of present catalysts. However, although there are several known soluble catalysts for inorganic reductions, most of these catalysts do not effectively catalyze the hydrogenation of olefins. This has been attributed to several factors, such as the failure of these catalysts to activate the olefinic substrate as well as the hydrogen molecule and the tendency of such catalysts to undergo hydrogenation themselves in preference to hydrogenation of the olefin. Thus, heretofore soluble catalysts satisfactory for use in the hydrogenation of alkenes have not been available to the art.

It is an object of this invention to provide a new and improved class of catalysts for the hydrogenation of alkenes.

It is another object to provide an improved hydrogenation method by which alkenes are hydrogenated in the presence of a catalyst which is soluble in the alkene.

Further objects will become apparent from time to time hereinafter.

This invention is based upon my discovery that secondary and tertiary amine-boranes are suitable as catalysts for the hydrogenation of alkenes and are sufficiently soluble in alkenes to permit their use as soluble hydrogenation catalysts. The amine-boranes which can be so used have the formula $X:BH_3$, where X is a secondary or tertiary amine. Amine-boranes derived from any secondary or tertiary amine which forms an amine-borane are included within the class of catalysts described herein. For example, X in the above formula may be, and preferably is, a tertiary alkyl amine, such as trimethylamine, triethylamine, dimenthylododecylamine, or tri-isooctyl-amine, or it can be a tertiary aryl amine, such as triphenylamine. X can also be an aromatic heterocyclic amine, such as pyridine, lutidine, collidine or quinoline (it may be noted that the term aromatic heterocyclic amine is used herein in the conventional sense and refers to compounds which contain the amine nitrogen in the ring; such compounds are tertiary amines). Amine-boranes formed from secondary amines can also be used, as in the case of secondary alkyl amines, such as dibutyl-amine, methylethylamine or dioctylamine, and secondary aryl amines, such as diphenylamine. Mixed alkyl aryl amines can also be used.

The amine-borane actalysts of this invention are useful in the hydrogenation of any alkene. Since it is the double bond which is the point of reaction in hydrogenation processes, the particular alkene used is relatively unimportant to the operability of the process. Some examples of the various alkenes which are reduced by the use of hydrogen in conjunction with an amineborane catalyst as described above are ethylene, propylene, isobutylene, 2-pentene, 1-heptene, 2-methyl-2-butene and octadecene. Amine-borane catalysts are particularly useful in the hydrogenation of alkenes containing from 2 to 18 carbon atoms.

The amount of amine-boranes used is not critical in that any amount produces some catalytic effect and results in some extent of hydrogenation. However, I prefer to use at least about 0.5 mol percent of amine-borane based on the mols of alkene used, and generally I use at least about 2 mol percent. Any amount in excess of this will produce satisfactory results but the amount used is, of course, limited by economic considerations. For such reasons, it is generally not desirable to use more than about 10 mol percent.

Hydrogenations of alkenes using my amine-borane catalysts are ordinarily carried out at temperatures between about 125° C. and 300° C. The pressure of hydrogen in the system should be at least about 25 atmospheres, but any pressure in excess of this can be used, limited solely by the materials of construction and equipment employed.

Several examples set forth below illustrate the method and practice of the invention and the manner in which amine-boranes are used. In these examples, a representative alkene, 1-octene, was hydrogenated using several amine-borane catalysts. The hydrogenations below were carried out in a 40 cc. stainless steel vessel into which the catalysts and octene were charged and a measured quantity of hydrogen then added. After the reaction had been conducted for the desired length of time, generally three hours, the reaction was quenched by immersing the bomb in liquid nitrogen. The products were then removed and analyzed by mass spectrometer analysis, gas chromatographic analysis, determination of bromine number and measurement of recovered hydrogen.

EXAMPLE I (*Blank Run*)

Thirty millimols of 1-octene and 55 millimols of hydrogen were reacted at 200° C. for 3 hours. The pressure was 1050 p.s.i.g. Hydrogen recovery was quantitative and gas chromatographic analysis and bromine number determination indicated that no hydrogenation of the octene had taken place.

EXAMPLE II

Thirty millimols of 1-octene and 60 millimols of hydrogen were reacted out in the manner set forth in Example I but in the presence of 1.37 millimols of trimethylamine-borane (4.6 mol percent of the octene present). n-Octane was recovered in 87% yield.

EXAMPLE III

A similar test was carried out using substantially the same amount of reactants and catalysts except that triethylamine-borane was used in place of the trimethylamine-borane. Again reduction took place to produce n-octane, although the yield after three hours was somewhat less than in the case of trimethylamine-borane.

EXAMPLE IV

The reaction as described above was repeated except that dimethyldodecylamine-borane was used as the catalyst. n-Octane was obtained in a yield of about 68% in three hours.

EXAMPLE V

A similar reaction to the above was carried out using pyridine-borane as the catalyst. Again reduction took place to produce n-octane, although the yield was relatively low, i.e., about 10%.

The above and other similar tests carried out using the procedures as described above demonstrated the efficacy of the other amine-boranes within the class set forth above as catalysts, and also showed that these catalysts can be used to hydrogenate any alkene, i.e., any aliphatic olefinic hydrocarbon. While the amount of hydrogenation is in some cases relatively low, it should be noted that optimum conditions differ for each reaction system. The various reactions exemplified above were carried out using identical conditions in order to set forth comparative data; however, yields are improved by variation of the reaction conditions when using various catalysts and alkenes. The effect of varying conditions in the case of amine-borane catalyzed hydrogenations is generally similar to the effect of different conditions in hydrogenation of alkenes using other types of catalysts, such as reduced metal catalysts. Thus, the conditions to be used with any particular reaction system are easily determined by one familiar with known hydrogenation procedures, and excellent yields are thereby obtained.

According to the provisions of the patent statutes, I have explained the principle and mode of practicing my invention and have described what I now consider to be its best embodiments. However, I desire to have it understood that, within the scope of the appended claims, the invention may be practiced otherwise than as specifically described.

I claim:

1. A method of hydrogenating alkenes which comprises reacting hydrogen with an alkene at a temperature between about 125° C. and 300° C. and a pressure of at least about 25 atmospheres, in the presence of a catalytic quantity of amine-borane of the formula $X:BH_3$ where X is selected from the group consisting of secondary and tertiary amines containing only C, H and N, and recovering the paraffin thus produced.

2. A method in accordance with claim 1 in which the quantity of said amine-borane is between 2 and 10 mol percent based on the amount of alkene used.

3. A method of hydrogenating alkenes which comprises reacting hydrogen with an alkene at a temperature between about 125° C. and 300° C. and a pressure of at least about 25 atmospheres, in the presence of a catalytic quantity of tertiary alkyl amine-borane, and recovering the paraffin thus produced.

4. A method in accordance with claim 3 in which the amine-borane is trimethylamine-borane.

5. A method of hydrogenating alkenes which comprises reacting an alkene with hydrogen at a temperature between about 125° C. and 300° C. and a pressure of at least about 25 atmospheres, in the presence of a catalytic quantity of a secondary alkyl amine-borane, and recovering the paraffin thus produced.

6. A method of hydrogenating alkenes which comprises reacting an alkene with hydrogen at a temperature between about 125° C. and 300° C. and a pressure of at least 25 atmospheres, in the presence of a catalytic quantity of an heterocyclic amine-borane, said heterocyclic amine containing only C, H and N, and recovering the paraffin thus produced.

References Cited in the file of this patent

UNITED STATES PATENTS 2,973,337     Stroh et al. _____ Feb. 28, 1961